(12) United States Patent
Odaka et al.

(10) Patent No.: US 7,388,315 B2
(45) Date of Patent: Jun. 17, 2008

(54) FILM-LIKE ELECTRODE MEMBER WITH LOCAL THICK SECTION FOR ASSEMBLING AND POSITIONING PURPOSES, AND ELECTROSTATIC MOTOR HAVING THE SAME

(75) Inventors: Shunichi Odaka, Minamitsuru-gun (JP); Isao Kariya, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 167 days.

(21) Appl. No.: 11/038,224

(22) Filed: Jan. 21, 2005

(65) Prior Publication Data
US 2005/0162037 A1    Jul. 28, 2005

(30) Foreign Application Priority Data
Jan. 23, 2004    (JP)    ............................. 2004-016083

(51) Int. Cl.
*H02N 1/00* (2006.01)
(52) U.S. Cl. ...................................................... 310/309
(58) Field of Classification Search ................. 310/309
See application file for complete search history.

(56) References Cited

U.S. PATENT DOCUMENTS 5,055,731 A * 10/1991 Nihei et al. .................. 310/309

(Continued)

FOREIGN PATENT DOCUMENTS

| EP | 0 584 479 A1 | 3/1994 |
| EP | 1 139 553 A2 | 10/2001 |
| EP | 1 139 553 A3 | 10/2001 |
| JP | 6-78566 | 3/1994 |
| JP | 09-037569 | * 2/1997 |
| WO | 95/28761 | 10/1995 |

OTHER PUBLICATIONS

Niino et al. (Niino)(Development of An Electrostatic Actuator Exceeding 10N Propulsion Force), Micro Electro Mechanical Systems '92, pp. 122-127 Feb. 1992.*

(Continued)

*Primary Examiner*—Karl I Tamai
(74) *Attorney, Agent, or Firm*—Drinker Biddle & Reath LLP

(57) ABSTRACT

A film-like electrode member, used as a stationary member or a movable member of an electrostatic motor. The film-like electrode member is provided with an insulating substrate including a major surface and a back surface opposite to the major surface; a plurality of electrodes arranged along the major surface of the insulating substrate at predetermined intervals; a main section including at least a part of the plural electrodes and of the insulating substrate carrying the electrodes; a locally thick section integrally joined to the main section and having a thickness larger than the main section; and a conducting element formed on the thick section and connected to the plurality of electrodes. The thick section includes a protrusion element having insulating properties and locally protruding from the major surface of the insulating substrate; and the conducting element is formed continuously on the insulating substrate and the protrusion element. The major surface of the insulating substrate of a first film-like electrode member is disposed to be opposed to the back surface of the insulating substrate of a second film-like electrode member, and the thick section of the first film-like electrode member and the thick section of the second film-like electrode member is brought into abutment with each other.

9 Claims, 9 Drawing Sheets

U.S. PATENT DOCUMENTS

| | | | |
|---|---|---|---|
| 5,189,323 A | | 2/1993 | Carr et al. ............ 310/40 MM |
| 5,378,954 A | * | 1/1995 | Higuchi et al. ............. 310/309 |
| 5,541,465 A | * | 7/1996 | Higuchi et al. ............. 310/309 |
| 5,585,683 A | * | 12/1996 | Higuchi et al. ............. 310/309 |
| 5,708,319 A | * | 1/1998 | Ban et al. ................... 310/309 |
| 6,619,999 B2 | * | 9/2003 | Bright ........................ 439/751 |
| 2005/0162036 A1 | * | 7/2005 | Odaka et al. ............... 310/309 |
| 2005/0162037 A1 | * | 7/2005 | Odaka et al. ............... 310/309 |
| 2005/0162038 A1 | * | 7/2005 | Odaka et al. ............... 310/309 |
| 2005/0212382 A1 | * | 9/2005 | Odaka et al. ............... 310/309 |
| 2006/0064865 A1 | * | 3/2006 | Odaka et al. ................. 29/596 |

OTHER PUBLICATIONS

Machine Translation of JP 09-073569, Feb. 1997.*

Niino et al., "Dual Excitation Multiphase Electrostatic Drive", Industry Applications Conference, 1995. Thirtieth IAS Annual Meeting, IAS '95., Conference Record of the 1995 IEEE, Oct. 1995, pp. 1318-1325.*

Niino et al., "Electrostatic Artificial Muscle: Compact, High Power, Linear Actuators with Multiple Layer Structure", Workshop on Micromechanical Systems, Oiso Japan, Jan. 1994.*

* cited by examiner

FILM-LIKE ELECTRODE MEMBER WITH LOCAL THICK SECTION FOR ASSEMBLING AND POSITIONING PURPOSES, AND ELECTROSTATIC MOTOR HAVING THE SAME

BACKGROUND OF THE INVENTION

1. Field of the Invention

The present invention relates to an electrostatic motor which generates a driving force using an electrostatic force and, more particularly, to a film-like electrode member used for the electrostatic motor.

2. Description of the Related Art

There has been developed an electrostatic motor in which each of a stationary member (or a stator) and a movable member is formed from a film-like electrode member including a film-like insulating substrate and a plurality of electrodes arranged thereon, a multi-phase AC power source being connected to each film-like electrode member so as to move the two film-like electrode members relative to each other. As compared to an electric motor using an electromagnetic force, this type of the electrostatic motor does not require a large mass component, such as a magnetic coil or a permanent magnet, and thus can be easily fabricated in a small size, which permits it to be utilized as, e.g., a drive source for a micro-machine.

Japanese Unexamined Patent Publication (Kokai) No. 6-78566 (JP6-78566A) discloses an electrostatic motor provided with a stationary member including an insulating substrate and a plurality of electrodes arranged along a major surface of the insulating substrate at predetermined intervals, and a movable member including another insulating substrate and a plurality of electrodes arranged on a major surface of the insulating substrate at predetermined intervals. In this electrostatic motor, the stationary member and the movable member are assembled together relatively movably in a direction along the major surfaces thereof, with the respective plural electrodes (usually, strip-shaped or line-shaped electrodes) being regularly opposed to each other. In this state, a three-phase AC voltage is applied to, e.g., every three parallel electrodes in the respective sets of electrodes of the stationary member and the movable member, to generate an electrostatic force between the two sets of electrodes due to traveling-wave electric fields having different phases, so that a driving force is generated in the movable member so as to act in a direction of the parallel arrangement of the electrodes (or in the direction along the major surface).

JP6-78566A also discloses a laminated configuration constructed by alternately stacking plural stationary members and plural movable members, so as to provide plural sets of stationary members and movable members, each set having opposing electrodes, for the purpose of increasing the output power of a single motor. JP6-78566A further discloses a linear electrostatic motor in which the movable member linearly moves relative to the stationary member, and a rotary electrostatic motor in which the movable member rotates about an axis relative to the stationary member.

In the laminated configuration, in general, the plural stationary members are arranged to be stacked at predetermined intervals with spacers interposed therebetween, the plural movable members are arranged to be stacked at predetermined intervals with other spacers interposed therebetween, and the stack of the stationary members and the stack of the movable members are assembled together in such a manner that the respective stationary members and the respective movable members are alternately arranged. Each spacer is dimensioned to have a thickness slightly larger than the thickness of the insulating substrate of the stationary or movable member, in order to maintain a required small clearance between the major surface of the stationary member and the major surface of the movable member. Further, each spacer may incorporate therein a connection conductor, such as an electrically conductive rubber, an electrically conductive spring or an electrically conductive pin, for electrically connecting the plural stationary members with each other or for electrically connecting the plural movable members with each other.

In the conventional electrostatic motor having the laminated configuration, as described above, in order to maintain the plural stationary members and the plural movable members at respective predetermined intervals, the spacers formed separately from the film-like electrode members of the stationary and movable members are used, and the laminated configuration is provided through an assembling process. Such an assembling process is generally complex and requires skill. For example, in the case where the connection conductor as a resilient member, such as an electrically conductive rubber or an electrically conductive spring, is incorporated in each spacer, a positional deviation may be caused between the stationary member and the movable member in a direction other than the direction of thickness thereof. In this connection, generally in the electrostatic motor, the electrode pitch of the stationary or movable member is about 0.1 to 1 mm. Therefore, the slight positional deviation caused during the assembling process turns into a large error of the fine electrode patterns in the stationary and movable members, which may result in a difficulty in obtaining a theoretical output power. Besides, it is difficult to visually confirm whether the spacers and the connection conductors are accurately arranged between the stacked plural stationary and movable members.

SUMMARY OF THE INVENTION

It is an object of the present invention to provide a film-like electrode member, used as a stationary member or a movable member of an electrostatic motor, capable of facilitating an assembling process of the electrostatic motor while ensuring a relative positional accuracy between the stationary member and the movable member.

It is another object of the present invention to provide an electrostatic motor which can be easily assembled while maintaining a relative positional accuracy between the stationary member and the movable member.

In order to accomplish the above objects, according to one aspect of the present invention, there is provided a film-like electrode member, used as a stationary member or a movable member of an electrostatic motor, comprising an insulating substrate including a major surface and a back surface opposite to the major surface; a plurality of electrodes arranged along the major surface of the insulating substrate at predetermined intervals; a main section including at least a part of the plurality of electrodes and of the insulating substrate carrying the electrodes; a local thick section integrally joined to the main section and having a thickness larger than the main section; and a conducting element formed on the thick section and connected to the plurality of electrodes.

In the above film-like electrode member, the thick section may include a protrusion element having insulating properties and locally protruding from the major surface of the insulating substrate; and the conducting element may be formed continuously on the insulating substrate and the protrusion element.

Also, the thick section may include a through hole perforating across a thickness of the thick section; and the conducting element may include a metal coat formed on a wall surface of the through hole.

Also, in a case where a plurality of film-like electrode members are provided and the major surface of the insulating substrate of a first film-like electrode member is disposed to be opposed to the back surface of the insulating substrate of a second film-like electrode member, the thick section of the first film-like electrode member and the thick section of the second film-like electrode member may be brought into abutment with each other, to form a gap between the main section of the first film-like electrode member and the main section of the second film-like electrode member, the gap being capable of receiving the main section of a third film-like electrode member in a condition free from contact.

Also, the conducting element may include a land portion formed at a side of at least one of the major surface and the back surface of the insulating substrate.

In this arrangement, in a case where a plurality of film-like electrode members are provided and the major surface of the insulating substrate of a first film-like electrode member is disposed to be opposed to the back surface of the insulating substrate of a second film-like electrode member, the thick section of the first film-like electrode member and the thick section of the second film-like electrode member may be brought into abutment with each other, to accomplish conductive contact between the land portion of the conducting element located at a side of the major surface of the first film-like electrode member and the land portion of the conducting element located at a side of the back surface of the second film-like electrode member.

Also, the film-like electrode member may further comprise a cover film for covering at least one of the major surface and the back surface of the insulating substrate.

According to another aspect of the present invention, there is provided an electrostatic motor, comprising a stationary member; and a movable member capable of moving relative to the stationary member; wherein each of the stationary member and the movable member is constituted from the above-described film-like electrode member.

The above electrostatic motor may comprise a plurality of stationary members and a plurality of movable members, assembled with each other in a manner as to alternately arrange the stationary members and the movable members; wherein a stationary-member stack including the plurality of stationary members may be configured in a manner that the major surface of the insulating substrate of a first stationary member is disposed to be opposed to the back surface of the insulating substrate of a second stationary member, and that the thick section of the first stationary member and the thick section of the second stationary member are brought into abutment with each other, to form a gap between the main section of the first stationary member and the main section of the second stationary member, the gap being capable of receiving the main section of one movable member in a condition free from contact; and wherein a movable-member stack including the plurality of movable members may be configured in a manner that the major surface of the insulating substrate of a first movable member is disposed to be opposed to the back surface of the insulating substrate of a second movable member, and that the thick section of the first movable member and the thick section of the second movable member are brought into abutment with each other, to form a gap between the main section of the first movable member and the main section of the second movable member, the gap being capable of receiving the main section of one stationary member in a condition free from contact.

In this arrangement, the thick section of each of the stationary members and the movable members may include a through hole perforating across a thickness of the thick section; the conducting element of each of the stationary members and the movable members may include a metal coat formed on a wall surface of the through hole; the stationary-member stack may be provided with a first connection member inserted into the through hole of the thick section of each of the stationary members to electrically connect the stationary members with each other; and the movable-member stack may be provided with a second connection member inserted into the through hole of the thick section of each of the movable members to electrically connect the movable members with each other.

According to a further aspect of the present invention, there is provided an electrostatic motor, comprising a stationary-member stack including a plurality of stationary members, each of which is constituted from the above-described film-like electrode member; and a movable-member stack including a plurality of movable members, each of which is constituted from the above-described film-like electrode member, the movable-member stack being capable of moving relative to the stationary-member stack; the stationary-member stack and the movable-member stack being assembled with each other in a manner as to alternately arrange the stationary members and the movable members; the stationary-member stack being configured in a manner that the major surface of the insulating substrate of a first stationary member is disposed to be opposed to the back surface of the insulating substrate of a second stationary member, and that the thick section of the first stationary member and the thick section of the second stationary member are brought into abutment with each other, to accomplish conductive contact between the land portion of the conducting element located at a side of the major surface of the first stationary member and the land portion of the conducting element located at a side of the back surface of the second stationary member; the movable-member stack being configured in a manner that the major surface of the insulating substrate of a first movable member is disposed to be opposed to the back surface of the insulating substrate of a second movable member, and that the thick section of the first movable member and the thick section of the second movable member are brought into abutment with each other, to accomplish conductive contact between the land portion of the conducting element located at a side of the major surface of the first movable member and the land portion of the conducting element located at a side of the back surface of the second movable member.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

Figure 1:
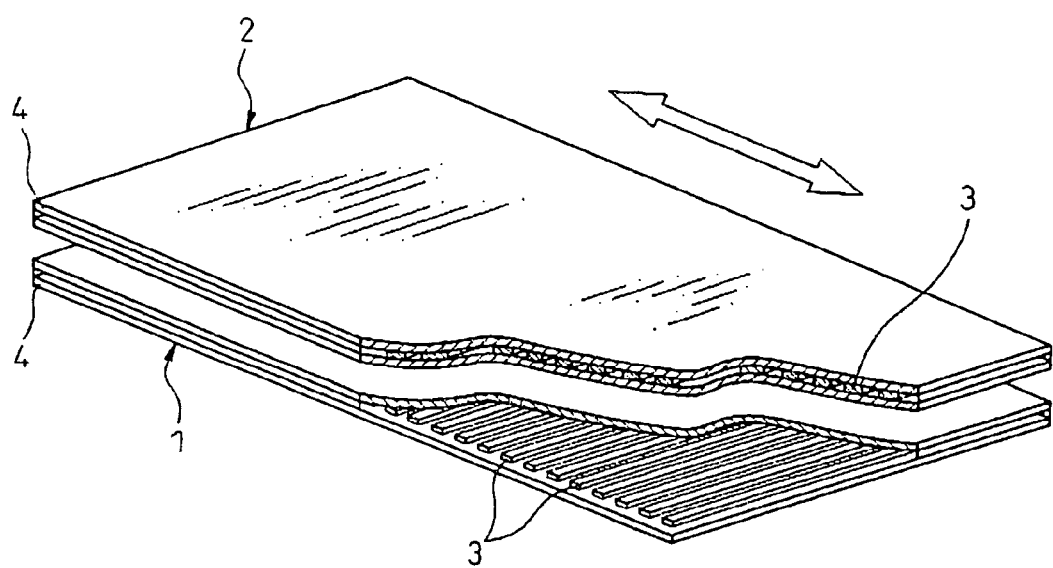
FIG. 1 is a partly cut-away perspective view showing the essential configuration of a linear electrostatic motor, to which the present invention is applicable.

The embodiments or the present invention are described below in detail, with reference to the accompanying drawings in the drawings, the same or similar components are denoted by common reference numerals.

First, the essential configurations of electrostatic motors, to which the present invention is applicable, will be described with reference to FIGS. 1 to 3.

FIG. 1 schematically shows the essential configuration of a linear electrostatic motor. A stationary member (or a stator) 1, formed from a film-like electrode member, includes a plurality of multi-phase electrodes 3 formed, e.g., as electrically conductive strip-shaped thin films, such as copper foils, or thin wires, which are embedded in an insulator 4 in a parallel arrangement at predetermined regular intervals. A movable member (or a translating member) 2, formed from a film-like electrode member, includes a plurality of multi-phase electrodes 3 embedded in an insulator 4 in a way similar to the stationary member. The respective phase outputs of a multi-phase AC power source are connected to a plurality of terminals (not shown) provided respectively in the stationary member 1 and the movable member 2. As a result, traveling-wave electric fields are generated respectively in the stationary member 1 and the movable member 2, whereby the movable member 2 undergoes a linear motion (shown by an arrow) relative to the stationery member 1 due to the traveling-wave electric fields. In this configuration, it is possible to produce a laminated-type linear electrostatic motor by stacking plural sets of stationary and movable members, each set including mutually opposed stationary member 1 and movable member 2, for the purpose of increasing an output power.

Figure 2:
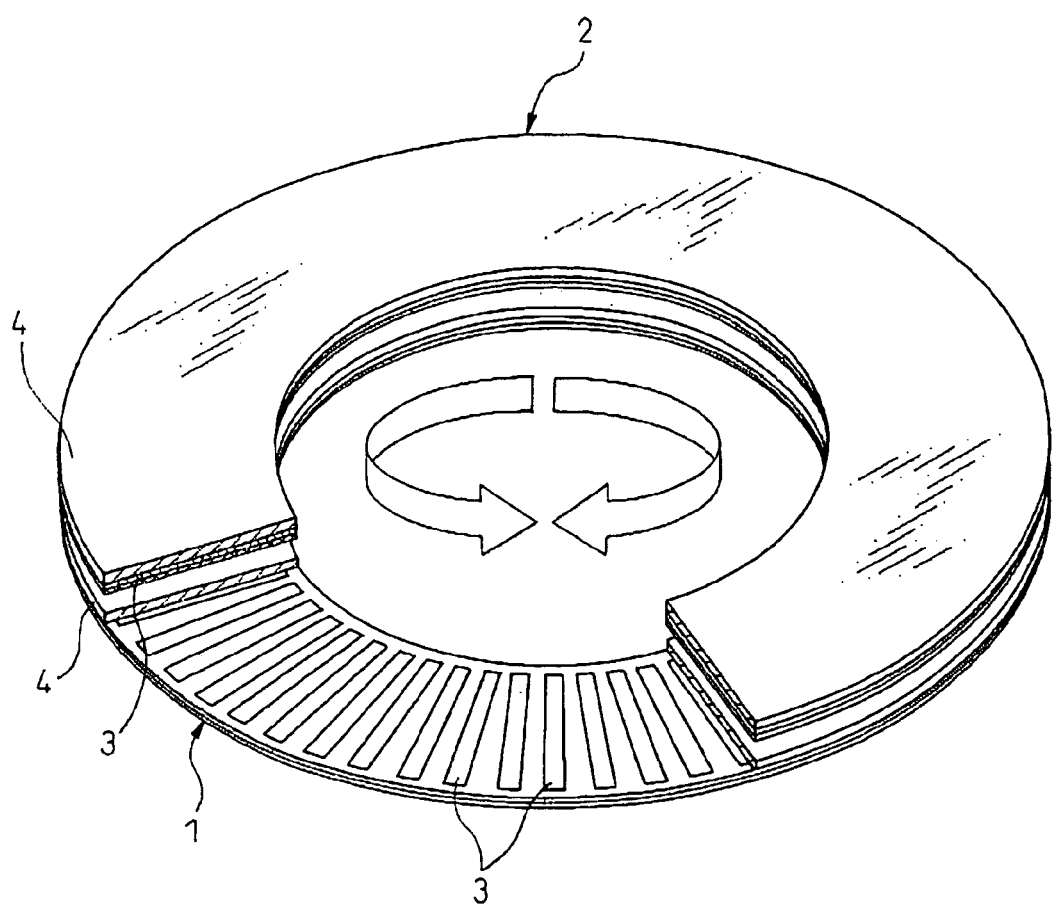
FIG. 2 is a partly cut-away perspective view showing the essential configuration of a rotary electrostatic motor, to which the present invention is applicable.

FIG. 2 schematically shows the essential configuration of a rotary electrostatic motor. The illustrated rotary electrostatic motor has substantially the same configuration as that of the linear electrostatic motor of FIG. 1 except that a plurality of multi-phase electrodes 3 are arranged radially at regular intervals, and thus the corresponding components are denoted by the same reference numerals. A stationary member 1, formed from a film-like electrode member, includes a plurality of multi-phase electrodes 3 formed, e.g., as electrically conductive strip-shaped thin films or thin wires, which are embedded in an insulator 4 in a radial arrangement at predetermined regular intervals. A movable member (or a rotor) 2, formed from a film-like electrode member, includes a plurality of electrodes 3 embedded in an insulator 4 in a way similar to the stationary member in the rotary electrostatic motor, a multi-phase AC power source is also connected respectively to the stationary member 1 and the movable member 2, so as to generate traveling-wave electric fields, whereby the movable member 2 undergoes a rotary motion (shown by an arrow) relative to the stationary member 1 due to the traveling-wave electric fields. In this configuration, it is also possible to produce a laminated-type rotary electrostatic motor by stacking plural sets of stationary and movable members, each set including mutually opposed stationary member 1 and movable member 2, for the purpose of increasing an output power.

Figure 3:
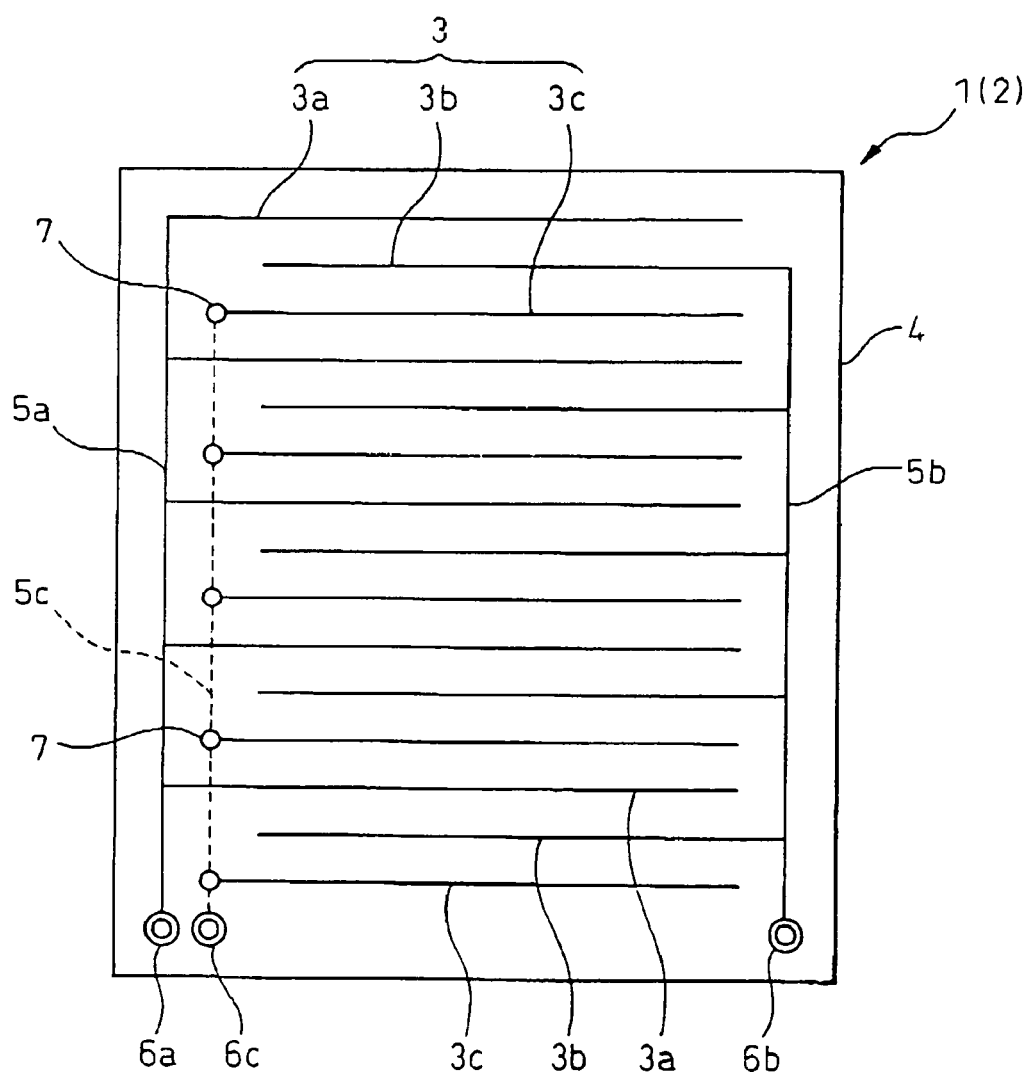
FIG. 3 is a plan view schematically showing the essential configuration of a film-like electrode member, usable as a stationary member and a movable member in the linear electrostatic motor of FIG. 1.

FIG. 3 illustrates a conductor pattern in the film-like electrode member constituting each of the stationary member 1 and the movable member 2 in the linear electrostatic motor of FIG. 1. A conductor pattern represented by a solid line is provided along the major surface of the insulator 4, and a conductor pattern represented by a broken line is provided along the back surface of the insulator 4.

In the illustrated example, the insulator 4 of the stationary member 1 (or the movable member 2) is provided with a plurality of electrodes 3 (3a, 3b, 3c) driven by a three-phase AC power source, plated through-hole type electrically conductive portions 6a, 6b, 6c connected respectively to the first, second and third phases of the three-phase AC power source, and current paths 5a, 5b, 5c for respectively connecting the electrically conductive portions 6a, 6b, 6c to the respective-phase electrodes 3a, 3b, 3c. The plural (five, in the drawing) first-phase electrodes 3a, 3a, . . . are connected through the current path 5a to the through-hole conductive portion 5a connected to the first phase of the power source, the plural (five, in the drawing) second-phase electrodes 3b, 3b, . . . are connected through the current path 5b to the through-hole conductive portion 6b connected to the second phase of the power source, and the plural (five, in the drawing) third-phase electrodes 3c, 3c, . . . are connected through the current path 5c to the through-hole conductive portion 6c connected to the third phase of the power source. In order to prevent the first to third-phase current paths 5a, 5b, 5c from coming into conductive contact with each other, the first and second-phase current paths 5a, 5b are disposed along the major surface of the insulator 4, while the third-phase current path 5c is disposed along the back surface of the insulator 4 and is connected to the third-phase electrode 3c via another through-hole electrically conductive portion 7.

Next, with reference to FIGS. 4A to 4J and 5, the configuration of a film-like electrode member 10, according to an embodiment of the invention, that can be applied to each of the stationary member 1 and the movable member 2 of the electrostatic motor having the above-described essential configuration, is described.

Figure 5:
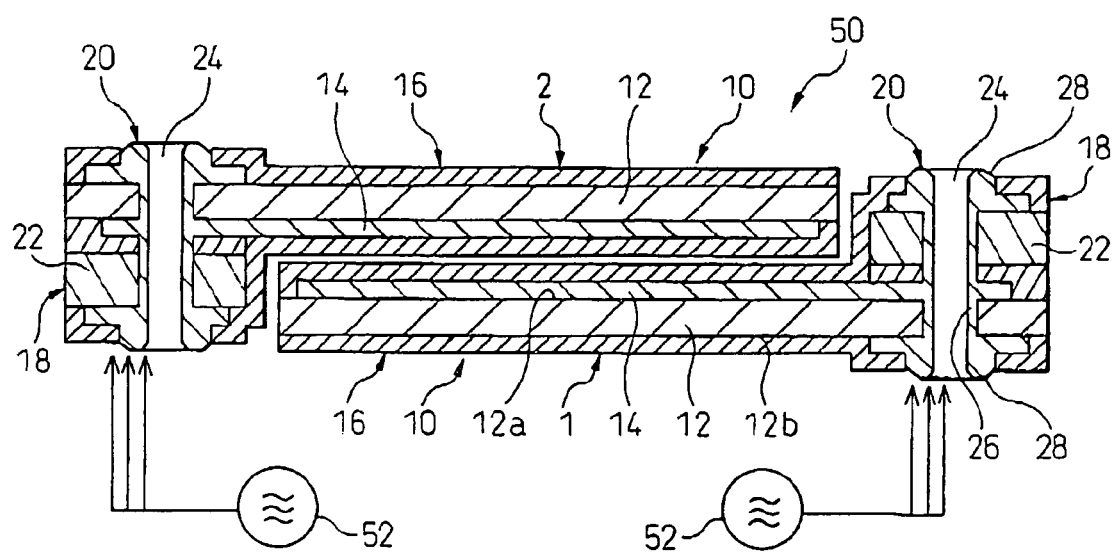
FIG. 5 is a sectional view schematically showing an electrostatic motor, according to one embodiment of the present invention, which includes a stationary member and a movable member, each formed from the film-like electrode members produced through the production steps of FIGS. 4A to 4J.

Referring to FIG. 5, the film-like electrode member 10 is provided with an insulating substrate 12 including a major surface 12a and a back surface 12b opposite to the major surface 12a; a plurality of electrodes 14 arranged along the major surface 12a of the insulating substrate 12 at predetermined intervals; a main section 16 including at least a part of the plural electrodes 14 and of the insulating substrate 12 carrying the electrodes 14; a local thick section 18 integrally joined to the main section 16 and having a thickness larger than the thickness of the main section 16; and a conducting element 20 formed on the thick section 18 and connected to the plural electrodes 14. The thick section 18 includes a protrusion element 22 having insulating properties and locally protruding from the major surface 12a of the insulating substrate 12. The conducting element 20 is formed continuously on both the insulating substrate 12 and the protrusion element 22. The thick section 18 is also provided with a through hole 24 perforating across the thickness of the thick section 18. The conducting element 20 includes a metal coat 26 formed on the wall surface of the through hole 24 and a land portion 28 formed at a side of at least one (both, in the drawing) of the major surface 12a and the back surface 12b of the insulating substrate 12.

Steps for producing the film-like electrode member 10 having the above configuration will now be described with reference to FIGS. 4A to 4J.

Figure 4A:
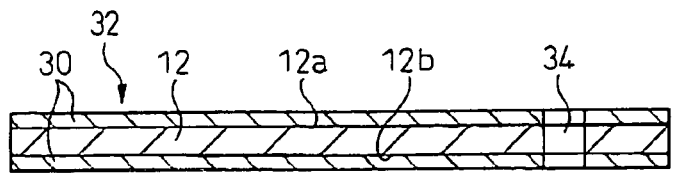
FIGS. 4A to 4J are sectional views schematically showing the steps for producing the film-like electrode member, usable as a stationary member and a movable member, according to an embodiment of the present invention.

First, a base material 32 (e.g., a copper-clad laminate, as a base material of a flexible printed board) formed by cladding electrically conductive films (copper foils, etc.) 30 onto both surfaces 12a, 12b of the insulating substrate 12 made of a film having flexibility and electrically insulating property is provided. The base material 32 is provided with at least one (or a desired number of) through hole 34 usable for a power-source connection (i.e., a hole for forming each of the through-hole conductive portions 6a to 6c, 7 in FIG. 3) formed at predetermined positions (FIG. 4A).

Figure 4B:
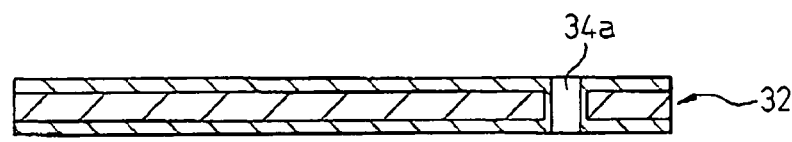

Next, in order to establish the electric conduction between the surfaces 12a, 12b of the insulating substrate 12, the inner surface of the through hole 34 is plated to form a through-hole plating 34a (FIG. 4B).

Figure 4C:
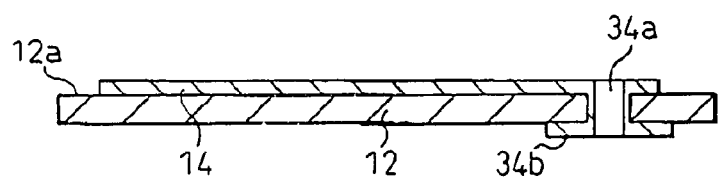

Next, a plurality of electrodes 14 (i.e., electrodes 3a to 3c in FIG. 3) for driving purposes and other conductors (i.e., current paths 5a to 5c in FIG. 3) are formed at one time, after resist applying, patterning and etching steps. At this time, an annular conductive portion 34b connected to the through-hole plating 34a is formed, for the through hole 34 corresponding to each of the through-hole conductive portions 6a to 6c of FIG. 3, on the back surface 12b of the insulating substrate 12 (FIG. 4C).

Figure 4D:
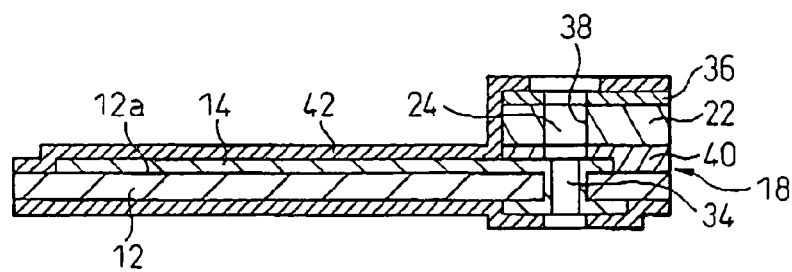
Figure 4E:
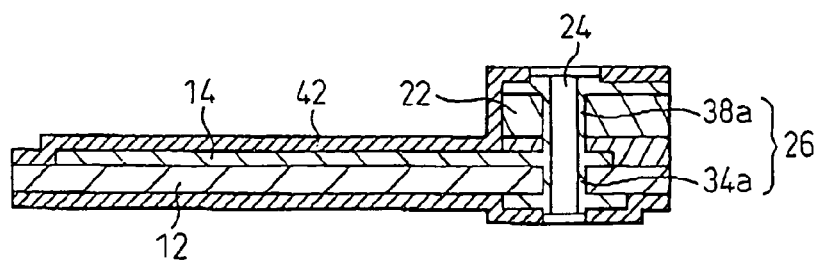

Next, a protrusion element 22 made of a film having electrically insulating property is provided, which acts as a spacer for maintaining a required small clearance between the opposing film-like electrode members 10 when a plurality of film-like electrode members 10 are stacked. An electrically conductive layer 36 is previously formed on one surface of the protrusion element 22, and at least one (or a desired number of) through hole 38, the location of which corresponds to the location of the through hole 34 in the insulating substrate 12, is previously formed in the protrusion element 22 so as to perforate through the conductive layer 36 by a desired perforating process. Then, the protrusion element 22 is adhered to the major surface 12a of the insulating substrate 12 by an adhesive 40, with the through hole 38 of the protrusion element 22 being aligned to the through hole 34 of the insulating substrate 12. Consequently, the thick section 18 provided with the through hole 24 (i.e., a hole corresponding to each of the through-hole conductive portions 6a to 6c of FIG. 3) is formed (FIG. 4D).

Next, using a plating resist 42, the through hole 24 in the thick section 18 is twice plated. As a result, the through-hole plating 34a of the insulating substrate 12 is integrally coupled with the through-hole plating 38a of the protrusion element 22, so as to form the metal coat 26 of the conducting element 20, and thus the protrusion element 22 constituting a spacer is electrically connected to a conductor (including the plural electrodes 14) provided on the insulating substrate 12.

Figure 4F:
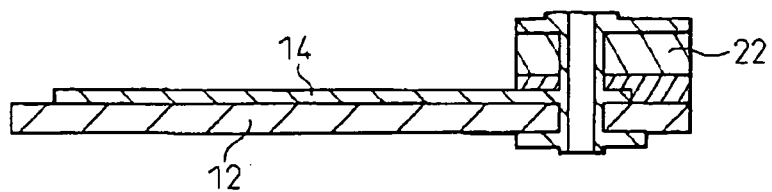

After the resist 42 is removed, the other required is conductive portions are patterned, by using a conductor-etching resist (FIG. 4F).

Figure 4G:
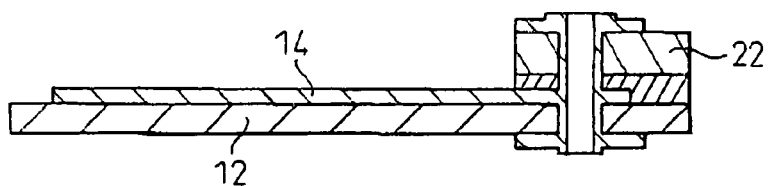

Thereafter, an etching step is performed, whereby an etching process for the film-like electrode member 10 is completed (FIG. 4G).

Figure 4H:
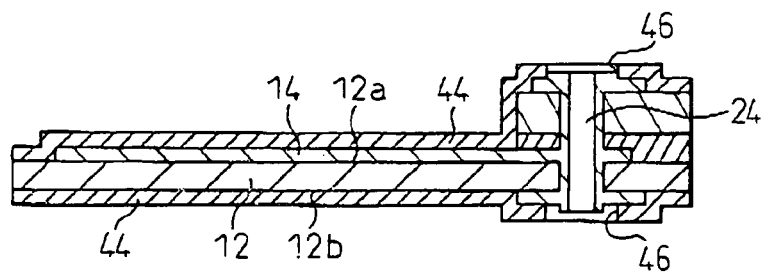

Next, cover films 44 are attached to both surfaces 12a, 12b of the insulating substrate 12 in an air-tight manner, to constitute an integrated member, by adhesion, coating or surface activation. Each cover film 44 is provided with an opening 46 previously formed at a location corresponding to the location of the through hole 24 of the thick section 18 (FIG. 4H).

Figure 4I:
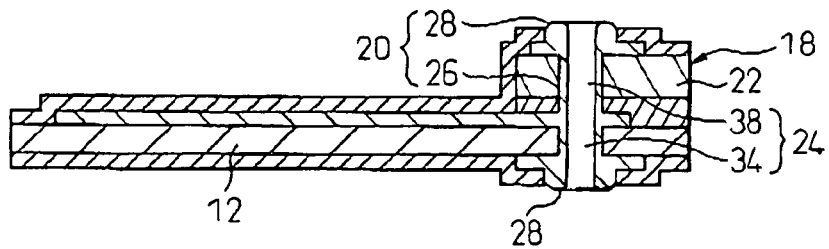

Then, a layer, thicker than the cover film 44, is plated onto a region of the opening 46 of each cover film 44, so as to form the annular land portion 28 projecting outward from each cover film 44. Consequently, the conducting element 20 including the metal coat 26 and the pair of land portions 28, integrally coupled with each other, is formed on the thick section 18 including the through hole 24 including the through hole 34 in the insulating substrate 12 and the through hole 38 in the protrusion element 22, communicated with each other (FIG. 4I). The through hole 24 in the thick section 18, for which the conducting element 20 is provided, corresponds to each of the through-hole conductive portions 6a to 6c in FIG. 3.

Figure 4J:
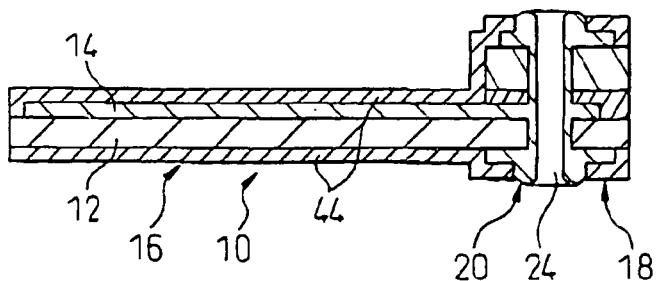

Finally, an unnecessary contour section of the film-like electrode member 10 is cut off, so that the production of the film-like electrode member 10 is completed. In the case where an electric plating is performed in each plating step, a section including current paths for the plating is also cut off (FIG. 4J).

As shown in FIG. 5, the film-like electrode member 10 produced through the above steps is used for each of the stationary member 1 and the movable member 2, and the stationary member 1 and the movable member 2 are arranged to be opposed to each other in a relatively movable manner through a small clearance defined therebetween, so that an electrostatic motor 50, as a base unit, according to an embodiment of the present invention is produced. In this configuration, a voltage is individually applied to the respective conducting elements of the stationary member 1 and the movable member 2, so as to generate positive and negative electrostatic forces between the respective sets of electrodes 14 of the members 1, 2, and thus to ensure a propelling or rotating power of the movable member 2 relative to the stationary member 1. In this connection, as a general matter in the electrostatic motor for controlling a driving direction, a multi-phase AC power source 52, in which voltage levels are sequentially varied, is used to individually apply the voltage to the conducting elements 20 of the stationary and movable members 1, 2. It should be noted that the multi-phase AC power source 52 for the stationary member 1 and the multi-phase AC power source 52 for the movable member 2 may be constituted from the same one. In this case, the phase orders, of the respective voltages applied to the stationary member 1 and the movable member 2, are mutually reversed. Also, from a practical viewpoint, it is desirable that the multi-phase AC power source 52 is a three-phase AC power source.

Figure 6:
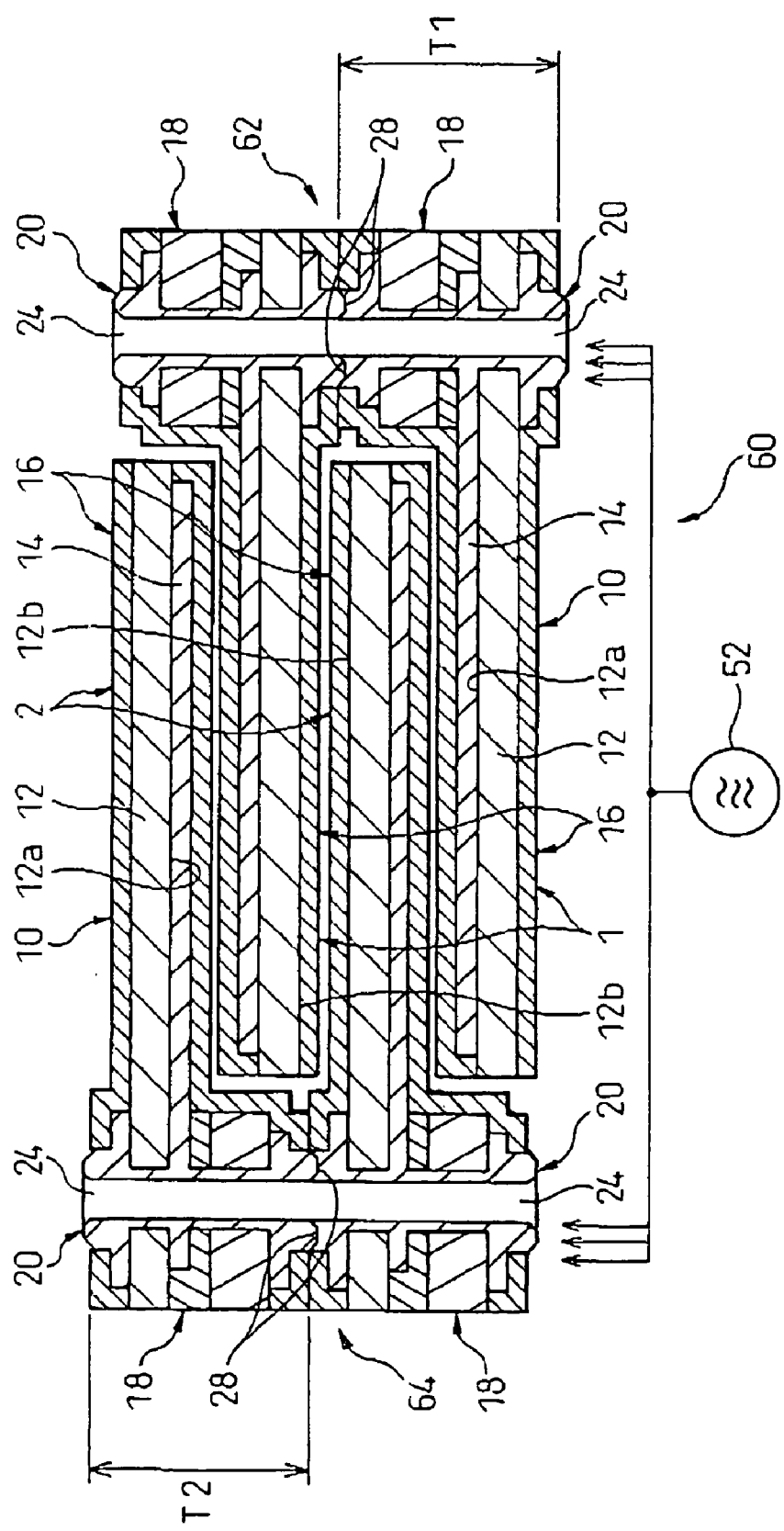
FIG. 6 is a sectional view schematically showing an electrostatic motor, according to the other embodiment of the present invention, which includes a stationary member and a movable member each formed from the film-like electrode members produced through the production steps of FIGS. 4A to 4J.

Further, as shown in FIG. 6, a plurality of stationary members 1 and a plurality of movable members 2, each of which is constructed from the film-like electrode member 10, are assembled together in a manner that the respective stationary members 1 and the respective movable members 2 are alternately arranged, so that a laminated high-power type electrostatic motor 60 according to another embodiment of the present invention is produced. In the embodiment illustrated in FIG. 6, a stationary-member stack 62 including two stationary members 1 and a movable-member stack 64 including two movable members 2 are arranged so that the members 1, 2 are alternately stacked in the direction of thickness of the film-like electrode member 10.

In the electrostatic motor 60, the stationary-member stack 62 including two stationary members 1 are configured in a manner that the major surface 12a of the insulating substrate 12 of a first stationary member 1 is disposed to be opposed to the back surface 12b of the insulating substrate 12 of a second stationary member 1, and that the thick sections 18 of the first and second stationary members 1 are brought into abutment with each other while maintaining a positional alignment therebetween. In this connection, the thickness T1 of the thick section 18 of each stationary member 1 is dimensioned so as to form a gap between the main sections 16 of the first and second stationary members 1, the gap being capable of receiving the main section 16 of one movable member 2 in a condition free from contact. Further, conductive contact is accomplished between the land portion 28 of the conducting element 20 located at a side of the major surface 12a of the first stationary member 1 and the land portion 28 of the conducting element 20 located at a side of the back surface 12b of the second stationary member 1.

Also, the movable-member stack 64 including two movable members 2 are configured in a manner that the major surface 12a of the insulating substrate 12 of a first movable member 2 is disposed to be opposed to the back surface 12b of the insulating substrate 12 of a second movable member 2, and that the thick sections 18 of the first and second movable members 2 are brought into abutment with each other while maintaining a positional alignment therebetween. In this connection, the thickness T2 of the thick section 18 of each movable member 2 is dimensioned so as to form a gap between the main sections 16 of the first and second movable members 2, the gap being capable of receiving the main section 16 of one stationary member 1 in a condition free from contact. Further, conductive contact is accomplished between the land portion 28 of the conducting element 20 located at a side of the major surface 12a of the first movable member 2 and the land portion 28 of the conducting element 20 located at a side of the back surface 12b of the second movable member 2.

In the electrostatic motor 60, as described above, when the main section 10 of the film-like electrode member 10 constituting the stationary member 1, in which the electrodes 14 are arranged, is disposed to be opposed, in a relatively movable manner, to the main section 16 of the film-like electrode member 10 constituting the movable member 2, in which the electrodes 14 are arranged, the thick section 18 of each film-like electrode element 10 functions as a spacer so as to create and maintain a suitable small clearance between the main sections 16 of the stationary and movable members 1, 2. Further, in this arrangement, as for each of the stationary-member stack 62 and the movable-member stack 64, the land portions 28 formed to project outwards on the thick sections 18 of the respective film-like electrode elements 10 come into conductive contact with each other, so that an electric connection between the stationary members 1 and an electric connection between the movable members 2 are established. In other words, when the stationary-member stack 62 and the movable-member stack 64 are to be produced, it is required only that a plurality of film-like electrode members 10 are mutually aligned and stacked while applying a pressure thereto in a thickness direction, so as to connect the conducting elements 20 having through holes 24 (corresponding to each of the through-hole conductive portions 6a to 6c in FIG. 3) of the respective film-like electrode members 10 to each other via the land portions 28, which also contributes to create a suitable small clearance between the mutually opposing stationary and movable members 1, 2 in an assembled structure of the stationary and movable-member stacks 62, 64.

Figure 7:
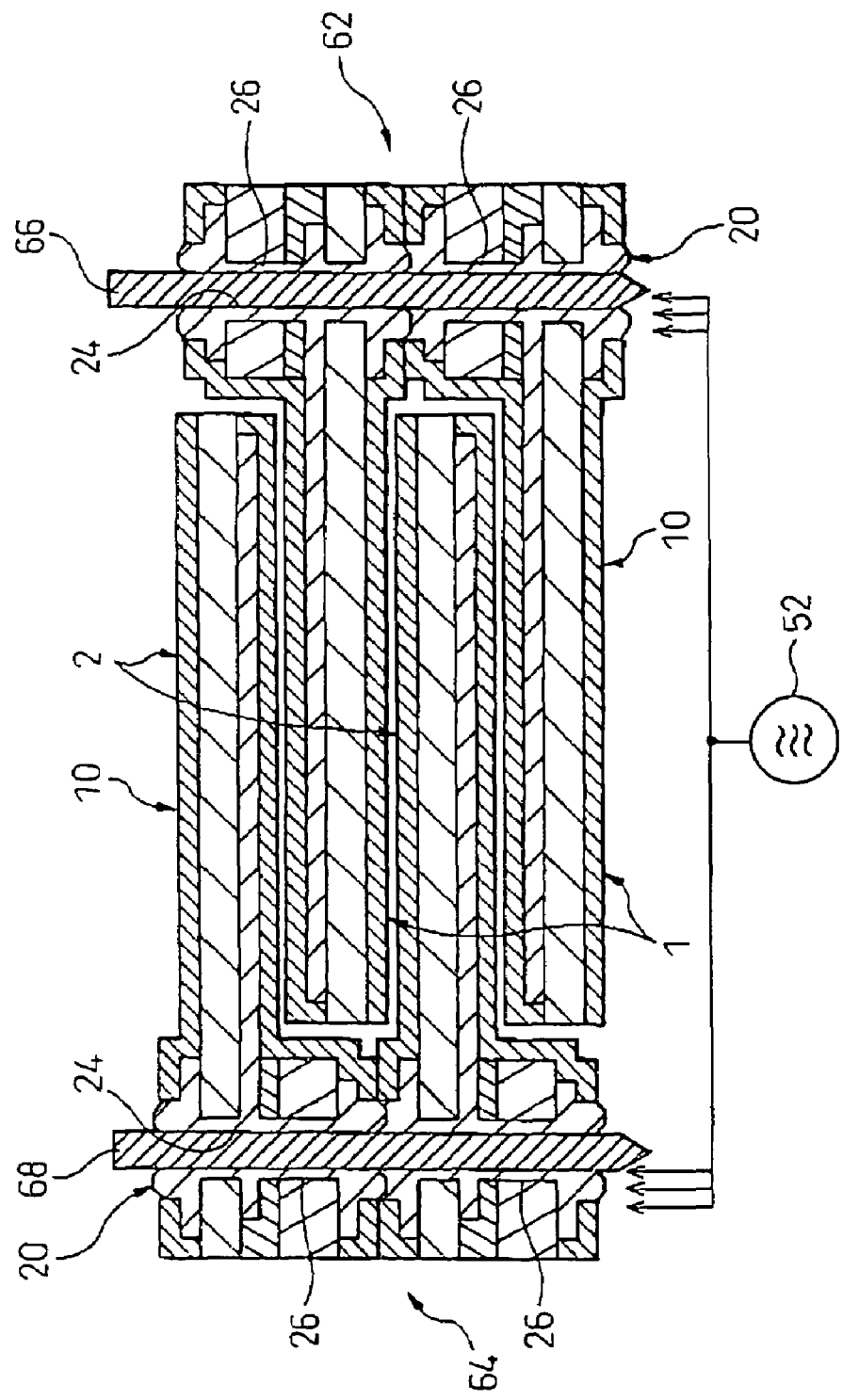
FIG. 7 is a sectional view schematically showing a modification of the electrostatic motor of FIG. 6.

In the electrostatic motor 60, according to a modified embodiment as shown in FIG. 7, the stationary-member stack 62 may be provided with a first connection member 66 inserted into the through holes 24 of the thick sections 18 of the stacked stationary members 1 to electrically connect the stationary members 1 with each other. Similarly, the movable-member stack 64 may be provided with a second connection member 68 inserted into the through holes 24 of the thick sections 18 of the stacked movable members 2 to electrically connect the movable members 2 with each other. The first and second connection members 66 and 68 may be constituted by, e.g., electrically conducting pins as illustrated.

According to the above arrangement, it is possible that the first and second connection members 66, 68 improve the reliability of the mutual electric connection through the land portions 28 of the opposing stationary members 1 as well as of the opposing movable members 2, provided that the through holes 24 and the metal coats 26 of the conducting elements 20 in the respective stationary and movable members 1, 2 are formed with a sufficiently high precision. Further, the first and second connection members 66, 68 contribute to the mutual positioning of the stacked stationary members 1 as well as of the stacked movable members 2.

In an electrostatic motor, such as the above-described electrostatic motor 60, in which a plurality of stationary members are connected to each other in a parallel stacked arrangement and also a plurality of movable members are connected to each other in a parallel stacked arrangement, the performance of the motor is affected by a mechanical positional deviation (particularly, a positional deviation in a driving direction) between the stacked stationary members and between the stacked movable members. In other words, despite a voltage (a multi-phase AC voltage) being applied to the respective stationary members or to the respective movable members in a synchronized manner, a mechanical positional deviation existing between the stationary members or between the movable members leads to a condition identical to a condition where the phases of voltages are deviated, and as a result of this, the mechanical output of the electrostatic motor is deteriorated or a reactive power in an electric power supply is increased. In this connection, in the electrostatic motor 60 of the above-described embodiment, the land portions 28 of the film-like electrode member 10 constituting each of the stationary members 1 and the movable members are formed by metal platings, so that mechanical connections in the stationary-member stack 62 and in the movable-member stack 64 exhibit a high rigidity not only in a thickness direction but also in a driving direction. Therefore, it is possible to effectively decrease the positional deviation of the plural stationary and movable members 1, 2 during an assembling process and also during a driving operation.

Also, the film-like electrode members 10 for the stationary members 1 and the movable members 2, as the essential components in the electrostatic motor 60, can be produced on the basis of a printed-circuit board manufacturing technique, so that it is possible to easily ensure the precision and stability of a producing process. Furthermore, as for the laminating and assembling process of the plural film-like electrode members 10, the problems in the prior art, such as the deterioration in precision caused by the use of a separate spacer, is overcome, due to the use of the film-like electrode member 10 provided integrally with the thick section 18 acting as a spacer instead of using the separate spacer, which readily improve the precision of assembling steps.

Also, as compared to the conventional structure including a combination of a film-like electrode member and a separate spacer, the film-like electrode member 10 having a spacer function establishes a large thickness of a film structure, which results in a high rigidity of the electrode member 10, and it is thus possible-to-suppress the deterioration of an assembling precision, which is otherwise caused by the warp of the film-like electrode members 10 during an assembling process. Besides, the film-like electrode member 10 provided integrally or unitarily with the thick section 18 has a weight somewhat larger than a conventional film-like electrode member, and thereby eliminates the disadvantage of displacement of the electrode member 10 due to an unintentional operation during the assembling process.

Further, in the electrostatic motor 60, it is possible to improve reliability in the electric connections between the stacked stationary members 1 and between the stacked movable members 2, due to the use of the connection members 66, 68 such as the electrically conducting pins, as described above. On the other hand, in a printed-circuit board manufacturing technique for providing electronic parts thereon, patterning and etching steps can result in a highly precise positioning, but through-hole drilling and hole inner-surface plating steps may sometimes result in an unsatisfactory precision. Therefore, if a sufficiently high precision is not expected for the through hole 24 and the metal coat 26, it may be advantageous that the stationary-member stack 62 and the movable-member stack 64 are assembled without using the connection members 66, 68, which may improve the assembling precision and result in good products.

Figure 8:
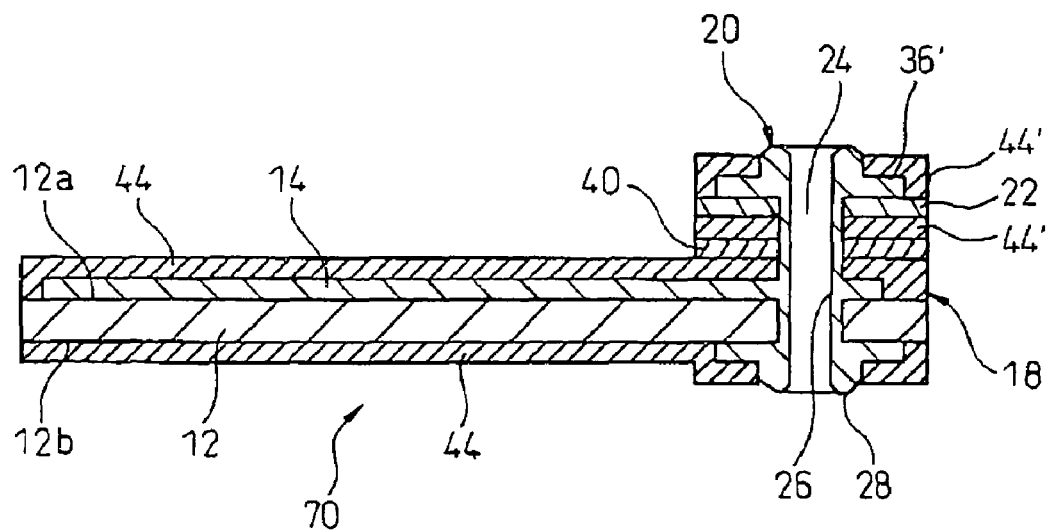
FIG. 8 is a sectional view schematically showing a film-like electrode member according to a further embodiment of the present invention.

FIG. 8 illustrates a film-like electrode member 70 according to another embodiment of the present invention. The film-like electrode member 70 has a configuration substantially identical to that of the above-described film-like electrode member 10, except for a different feature in a stacked configuration depending upon a different producing process. Therefore, corresponding components are denoted by common reference numerals, and the description thereof is not repeated.

The film-like electrode member 70 is produced in a manner as described below. First, a plurality of electrodes 14 for driving purposes (corresponding to the electrodes 3a to 3c in FIG. 3) and other conductors (corresponding to the current paths 5a to 5c in FIG. 3) are formed on a film-like insulating substrate 12 having an electrically conductive layer (corresponding to the base material 32 in FIG. 4A) at one time, via patterning and etching steps, without forming a through hole 34 (FIG. 4A). Next, cover films 44 are attached to both surfaces 12a, 12b of the insulating substrate 12 in an air-tight manner to constitute an integrated member, by an adhesion, a coating or a surface activation, so as to constitute a first film member. On the other hand, an electrically conductive portion 36' is formed on a film-like protrusion element 22 having an electrically conductive layer, via patterning and etching steps, without forming a through hole 38 (FIG. 4D). Next, cover films 44' are attached to both surfaces of the protrusion element 22, so as to constitute a second film member functioning as a spacer. Then, the second film member is affixed onto the first film member by using an adhesive 40, so as to form a thick section 18. The thick section 18 is subjected to a drilling step to form a through hole 24, and the through hole 24 and the peripheral area of the opening thereof are plated, so as to constitute a conducting element 20 including a metal coat 26 and a pair of land portions 28. In this way, the film-like electrode member 70 provided with the thick section 18 having the through hole 24, to which the conducting element 20 is formed, (corresponding to each of the through-hole conductive portions 6a to 6c in FIG. 3) is produced.

According to the above configuration, it is possible to ease a relative positioning step when the protrusion element 22 is affixed to the insulating substrate 12 with the adhesive 40. Note that there are some variations of the method of producing a printed board for electronic parts, and any method can be applied to the production of the film-like electrode member according to the present invention.

While the invention has been described with reference to specific preferred embodiments, it will be understood by those skilled in the art that various changes and modifications may be made thereto without departing from the spirit and scope of the following claims.

The invention claimed is:

1. A film-like electrode member, used as a stationary member or a movable member of an electrostatic motor, comprising:
   an insulating substrate including a major surface and a back surface opposite to said major surface;
   a plurality of electrodes arranged along said major surface of said insulating substrate at predetermined intervals;
   a main section including at least a part of said plurality of electrodes and of said insulating substrate carrying said electrodes;
   a local thick section integrally joined to said main section and having a thickness larger than said main section, wherein said main section and said local thick section comprises a unitary film-like member; and
   a conducting element formed on said thick section and connected to said plurality of electrodes;
   wherein said conducting element includes a land portion formed at a side of at least one of said major surface and said back surface of said insulating substrate;
   wherein, in a case where a plurality of film-like electrode members are provided and said major surface of said insulating substrate of a first film-like electrode member is disposed to be opposed to said back surface of said insulating substrate of a second film-like electrode member, said thick section of said first film-like electrode member and said thick section of said second film-like electrode member are brought into abutment with each other, to accomplish conductive contact between said land portion of said conducting element located at a side of said major surface of said first film-like electrode member and said land portion of said conducting element located at a side of said back surface of said second film-like electrode member; and
   wherein said conducting element includes a metal coat.

2. A film-like electrode member as set forth in claim 1, wherein said thick section includes a protrusion element having insulating properties and locally protruding from said major surface of said insulating substrate; and wherein said conducting element is formed continuously on said insulating substrate and said protrusion element.

3. A film-like electrode member as set forth in claim 1, wherein said thick section includes a through hole perforating across a thickness of said thick section; and wherein said conducting element includes a metal coat formed on a wall surface of said through hole.

4. A film-like electrode member as set forth in claim 1, wherein, in a case where a plurality of film-like electrode members are provided and said major surface of said insulating substrate of a first film-like electrode member is disposed to be opposed to said back surface of said insulating substrate of a second film-like electrode member, said thick section of said first film-like electrode member and said thick section of said second film-like electrode member are brought into abutment with each other, to form a gap between said main section of said first film-like electrode member and said main section of said second film-like electrode member, said gap being capable of receiving said main section of a third film-like electrode member in a condition free from contact.

5. A film-like electrode member as set forth in claim 1, further comprising a cover film for covering at least one of said major surface and said back surface of said insulating substrate.

6. An electrostatic motor, comprising:
a stationary member;
and a movable member capable of moving relative to said stationary member;
wherein each of said stationary member and said movable member is constituted from a film-like electrode member as set forth in claim 1.

7. An electrostatic motor as set forth in claim 6, comprising a plurality of stationary members and a plurality of movable members, assembled with each other in a manner as to alternately arrange said stationary members and said movable members;
wherein a stationary-member stack including said plurality of stationary members is configured in a manner that said major surface of said insulating substrate of a first stationary member is disposed to be opposed to said back surface of said insulating substrate of a second stationary member, and that said thick section of said First stationary member and said thick section of said second stationary member are brought into abutment with each other, to form a gap between said main section of said first stationary member and said main section of said second stationary member, said gap being capable of receiving said main section of one movable member in a condition free from contact; and
wherein a movable-member stack including said plurality of movable members is configured in a manner that said major surface of said insulating substrate of a first movable member is disposed to be opposed to said back surface of said insulating substrate of a second movable member, and that said thick section of said first movable member and said thick section of said second movable member are brought into abutment with each other, to form a gap between said main section of said first movable member and said main section of said second movable member, said gap being capable of receiving said main section of one stationary member in a condition free from contact.

8. An electrostatic motor as set forth in claim 7, wherein said thick section of each of said stationary members and said movable members includes said through hole perforating across a thickness of said thick section; wherein said conducting element of each of said stationary members and said movable members includes a metal coat formed on a wall surface of said through hole; wherein said stationary-member stack is provided with a first connection member inserted into said through hole of said thick section of each of said stationary members to electrically connect said stationary members with each other; and wherein said movable-member stack is provided with a second connection member inserted into said through hole of said thick section of each of said movable members to electrically connect said movable members with each other.

9. An electrostatic motor, comprising:
a stationary-member stack including a plurality of stationary members; and
a movable-member stack including a plurality of movable members, said movable-member stack being capable of moving relative to said stationary-member stack;
each of said stationary members and said movable members being constituted from a film-like electrode member as set forth in claim 1;
said stationary-member stack and said movable-member stack being assembled with each other in a manner as to alternately arrange said stationary members and said movable members;
said stationary-member stack being configured in a manner that said major surface of said insulating substrate of a first stationary member is disposed to be opposed to said back surface of said insulating substrate of a second stationary member, and that said thick section of said first stationary member and said thick section of said second stationary member are brought into abutment with each other, to accomplish conductive contact between said land portion of said conducting element located at a side of said major surface of said first stationary member and said land portion of said conducting element located at a side of said back surface of said second stationary member;
said movable-member stack being configured in a manner that said major surface of said insulating substrate of a first movable member is disposed to be opposed to said back surface of said insulating substrate of a second movable member, and that said thick section of said first movable member and said thick section of said second movable member are brought into abutment with each other, to accomplish conductive contact between said land portion of said conducting element located at a side of said major surface of said first movable member and said land portion of said conducting element located at a side of said back surface of said second movable member.

* * * * *